United States Patent
Lee et al.

(10) Patent No.: US 8,179,874 B2
(45) Date of Patent: May 15, 2012

(54) AUTOMATIC TUNNEL CONFIGURATION METHOD USING ROUTER ADVERTISEMENT MESSAGE

(75) Inventors: Joo Chul Lee, Daejeon (KR); Hyoung Jun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 560 days.

(21) Appl. No.: 12/518,049

(22) PCT Filed: Oct. 30, 2007

(86) PCT No.: PCT/KR2007/005381
§ 371 (c)(1),
(2), (4) Date: Jun. 5, 2009

(87) PCT Pub. No.: WO2008/069447
PCT Pub. Date: Jun. 12, 2008

(65) Prior Publication Data
US 2010/0316005 A1    Dec. 16, 2010

(30) Foreign Application Priority Data
Dec. 7, 2006 (KR) .................. 10-2006-0124050

(51) Int. Cl.
*H04W 4/00* (2009.01)
(52) U.S. Cl. ............................................. 370/338
(58) Field of Classification Search .......... 370/315, 370/329, 331–341, 401, 465–473; 455/411–456.1, 455/509
See application file for complete search history.

(56) References Cited

U.S. PATENT DOCUMENTS

| | | | |
|---|---|---|---|
| 6,832,087 | B2 | 12/2004 | Gwon et al. |
| 6,862,274 | B1* | 3/2005 | Tsao et al. ............ 370/338 |
| 2004/0097232 | A1 | 5/2004 | Haverinen |
| 2005/0094575 | A1 | 5/2005 | Park |
| 2005/0099976 | A1 | 5/2005 | Yamamoto et al. |
| 2006/0028285 | A1 | 2/2006 | Jang et al. |
| 2006/0092964 | A1 | 5/2006 | Park et al. |
| 2006/0104226 | A1 | 5/2006 | Ahn |

FOREIGN PATENT DOCUMENTS

| | | |
|---|---|---|
| KR | 10-2003-0061760 | 7/2003 |
| KR | 10-2005-0041820 | 5/2005 |
| KR | 10-2005-0065131 | 6/2005 |

(Continued)

OTHER PUBLICATIONS

"Neighbor Discovery for IP version 6 (IPv6)", RFC 2461, Dec. 1998, (pp. 1-92).

(Continued)

*Primary Examiner* — Derrick Ferris
*Assistant Examiner* — Mang Yeung
(74) *Attorney, Agent, or Firm* — Staas & Halsey LLP

(57) ABSTRACT

An automatic tunnel configuration method using a router advertisement message is provided, including: periodically receiving a router advertisement message containing a tunnel end-point address option from an access router of an internet protocol version 6 (IPv6) network when a mobile node moves from a home network to other IPv6 networks; automatically configuring a tunnel using an address allocated from the access router of the IPv6 network to which the mobile node connects, and the tunnel end-point address option included in the router advertisement message when the network to which the mobile node moves to connect is an internet protocol version 4 (IPv4) network; and communicating with a correspondent node via the configured tunnel using a mobile internet protocol (MIP6).

5 Claims, 7 Drawing Sheets

FOREIGN PATENT DOCUMENTS

| | | |
|---|---|---|
| KR | 10-0545683 | 1/2006 |
| KR | 10-2006-0009676 | 2/2006 |
| KR | 10-2006-0016496 | 2/2006 |
| KR | 10-2006-0054661 | 5/2006 |
| KR | 10-0636186 | 10/2006 |
| WO | 2005/043828 A1 | 5/2005 |

OTHER PUBLICATIONS

International Search Report for International Application No. PCT/KR2007/005381 (mailed on Feb. 5, 2008).

* cited by examiner

[Fig. 1]
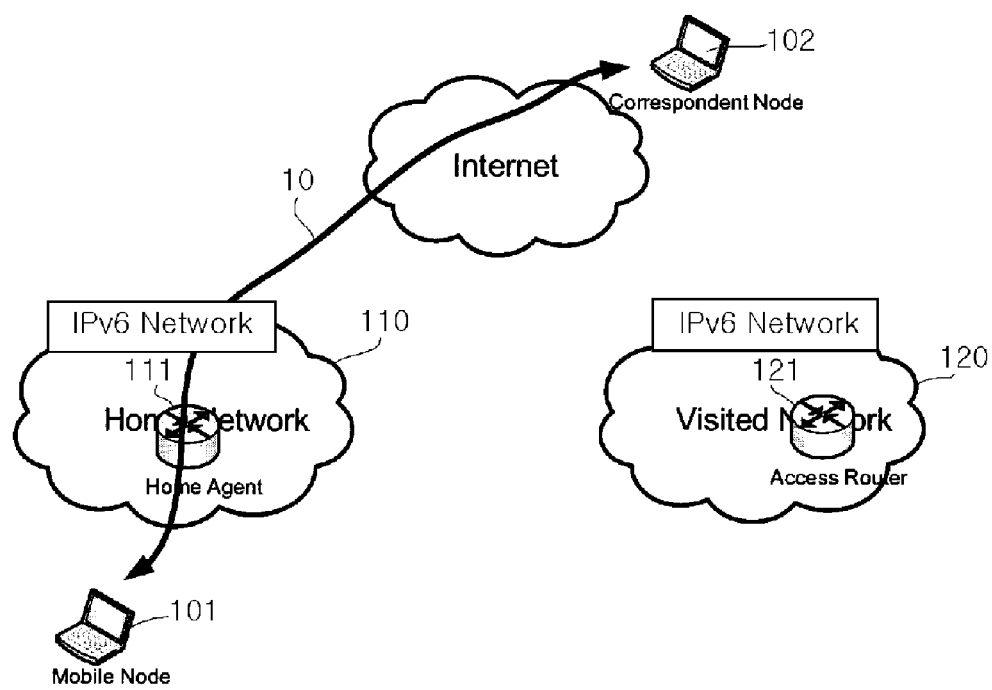

[Fig. 2]
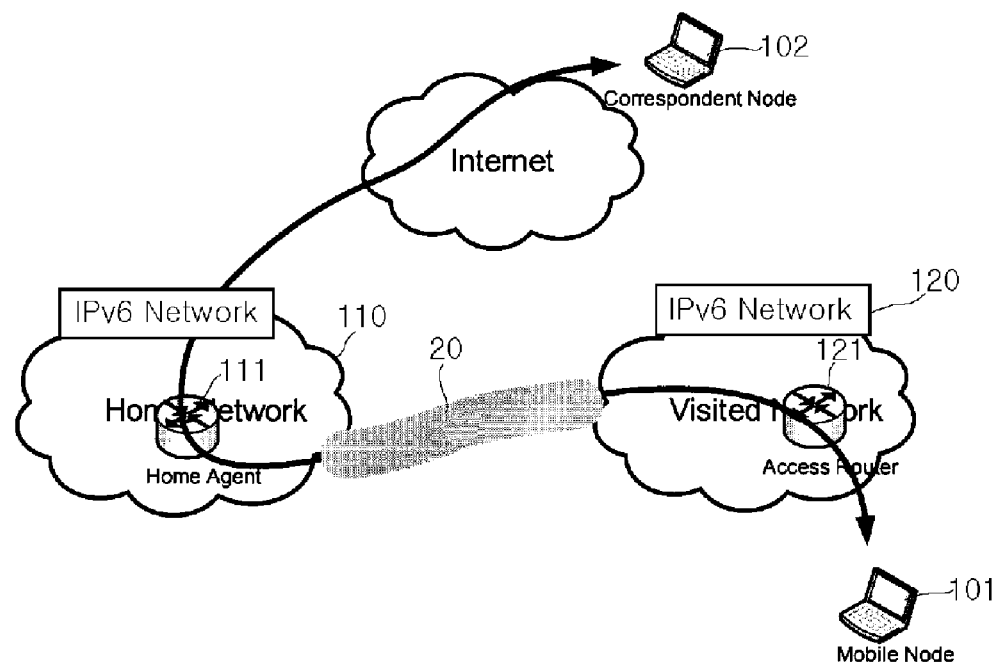

[Fig. 3]
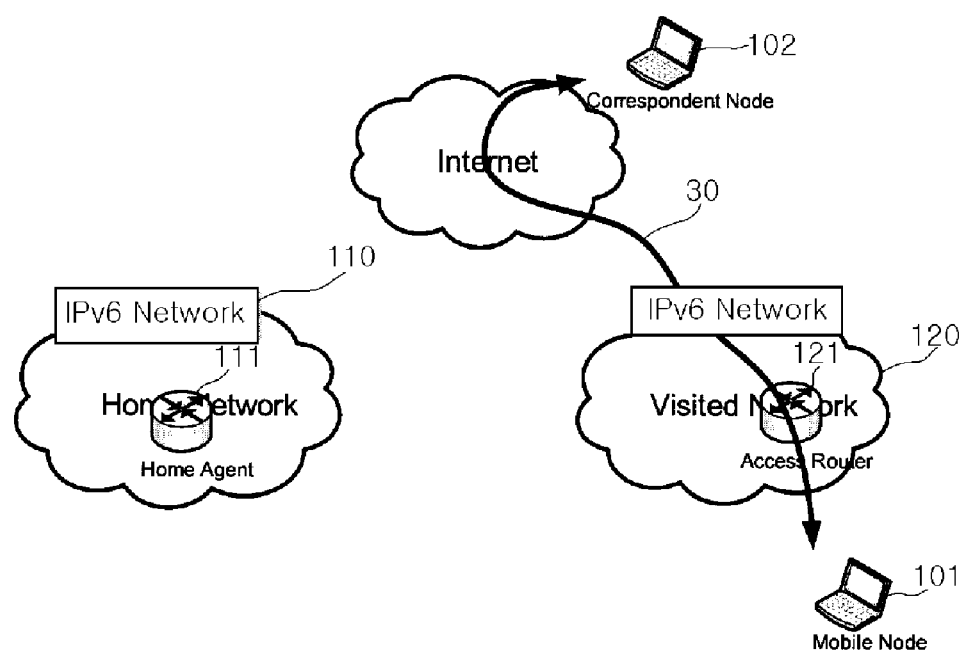

[Fig. 4]
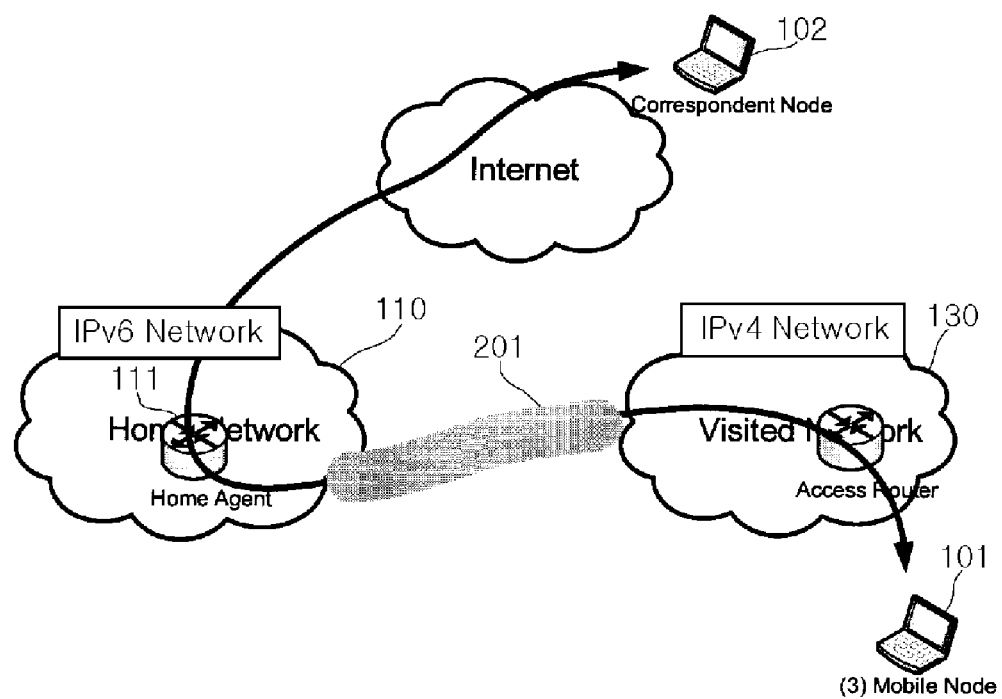

[Fig. 5]
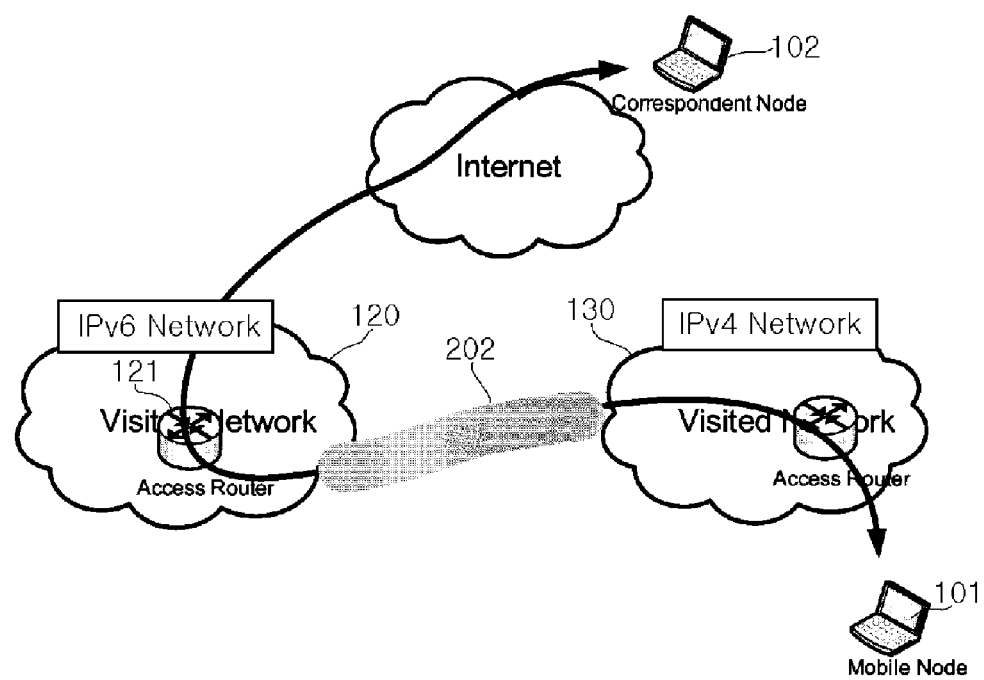

[Fig. 6]
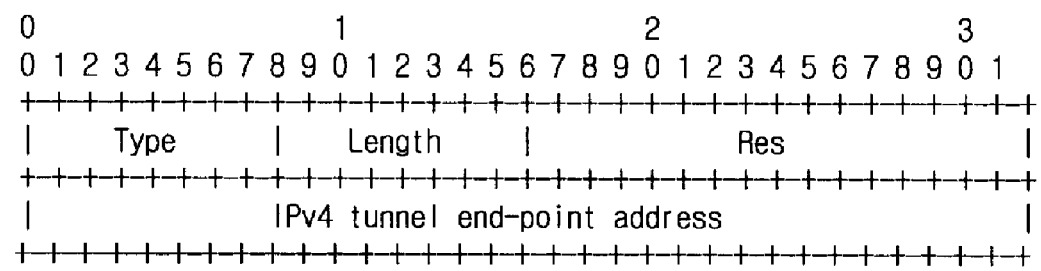

[Fig. 7]
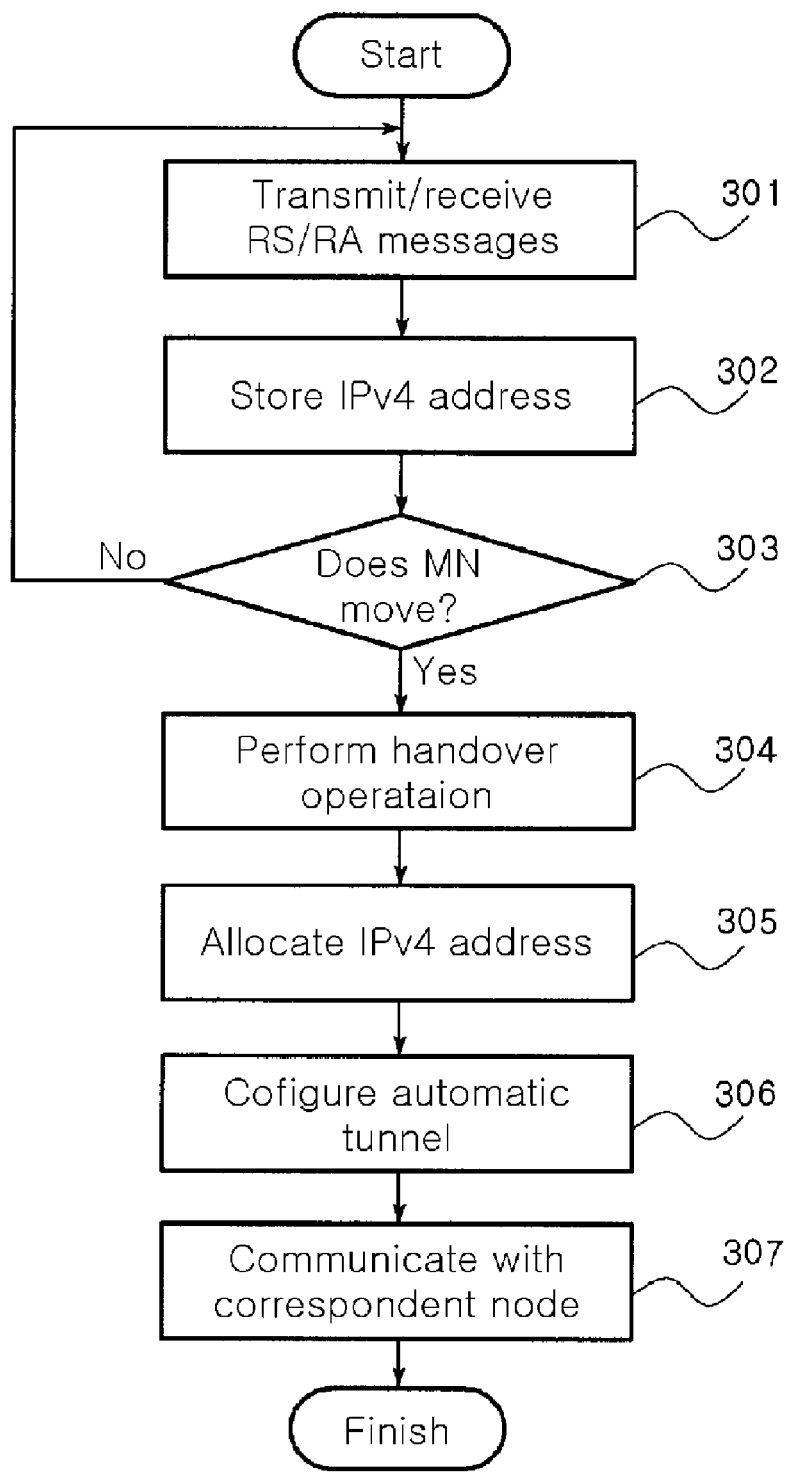

AUTOMATIC TUNNEL CONFIGURATION METHOD USING ROUTER ADVERTISEMENT MESSAGE

CROSS REFERENCE TO RELATED APPLICATIONS

This application claims the benefit under 35 U.S.C. Section 371, of PCT International Application PCT/KR2007/005381, filed Oct. 30, 2007, which claimed priority to Korean Application 10-2006-0124050, filed Dec. 7, 2006 in the Korean Intellectual Property Office, the disclosures of all of which are hereby incorporated by reference.

TECHNICAL FIELD

The present invention relates to an automatic tunnel configuration method, and more particularly, to a method for configuring an automatic tunnel using a router advertisement (RA) message when a mobile node using an MIP6 (Mobile IPv6) moves, the MIP6 operating in an IPv6 network under an internet environment in which various networks are used in a mixed state.

This work was supported by the IT R&D program of MIC/IITA [2006-P10-36, Study of Next Generation Network Technology Standardization for IPv6 based Mobility Support].

BACKGROUND ART

In general, MIP6 (Mobile IPv6), which is one of the mobile internet protocols, is a technology for supporting movement in an internet protocol version 6 (hereinafter, referred to as IPv6) network. The IPv6, which is the next version of the internet protocol version 4 (hereinafter, referred to as IPv4) that has been used for an internet transfer protocol, has been nearly standardized by the internet engineering task force (IETF). A general MIP6 operation where a mobile node moves from this IPv6 network to other networks will be described in detail.

As shown in accompanying FIG. 1, the mobile node 101 is connected to a home network 110 via an access router. An address allocated in an interface of the mobile node that is connected to a home agent 111 in the home network 110 is referred to as a home address (hereinafter, referred to as HoA), and the home address becomes an address of the mobile node that will be used in an application layer of the mobile node 101.

When the mobile node 101 is disconnected with the home network 110 and connected to a new network 120, the mobile node 101 generates a care of address (hereinafter, referred to as CoA) in the new network 120 and allocates an interface that will be connected to an access router (AR) 121 of the new network, as shown in the accompanying FIG. 2. Then, the mobile node 101 informs the address (CoA) to a home agent 111 through a binding update (BU) message. Therefore, the home agent 111 transfers traffic, which comes to a HoA address, to the CoA through an IPv6 over IPv6 tunnel 20. Then, the mobile node 101 intactly transfers a packet received from a tunnel to an application. However, the mobile node 101 always communicates with a correspondent node (CN) 102 only through the home agent 111 since its path optimization process is not achieved in this state.

Accordingly, the mobile node 101 directly communicates with the correspondent node 102 through the path optimization process without passing through the home agent 111, as shown in the accompanying FIG. 3. In this path optimization process, the mobile node 101 transmits a BU message to a correspondent node 102 to allow the correspondent node 102 to directly transfer a packet to the CoA in the future. The packet, which has transmitted the CoA to its destination as described above, is received in the mobile node 101, and then converts a destination address into a HoA and transfers the converted HoA to an application before the mobile node 101 finally transfers a packet to the application in order to maintain the connection in an application level.

The above-mentioned general operation of the MIP is performed on the assumption that the MIP is entirely operated in the IPv6 networks.

However, the IPv4 has been used in the internet addressing system since it is still not completely changed into the IPv6. Such change of the IPv4 into the IPv6 network may not occur in a moment, and therefore it is expected that the IPv4 and IPv6 networks will be used together for a long time. Therefore, the case that the IPv4 network and the IPv6 network are used in a mixed state should be surely considered to make an application of the MIP6 that stands on the basis of the IPv6 network.

However, in case a mobile node moved to an IPv4 network, it is difficult to ensure the operation of the mobile node in the IPv4 network using the MIP6 protocol that is on the assumption of the operation in the IPv6 network. Therefore, there has been required an automatic tunneling method where a mobile node may pass through the IPv4 network and then maintain the connecting with the original IPv6 network.

DISCLOSURE OF INVENTION

Technical Problem

An aspect of the present invention provides a method for configuring automatic tunneling using a RA message in order to maintain the connection with an IPv6 network even when a mobile node using an MIP6 protocol moves to an IPv4 network under a network environment where the IPv4 and IPv6 networks are used in a mixed state.

Technical Solution

According to an aspect of the present invention, there is provided an automatic tunnel configuration method using a router advertisement message in mobile node, including: receiving a router advertisement message containing a tunnel end-point address option from an access router of an internet protocol version 6 (IPv6) network; automatically configuring a tunnel using an address allocated from the access router of a IPv4 network to which the mobile node connects, and the tunnel end-point address option included in the router advertisement message when the network to which the mobile node moves to connect is an internet protocol version 4 (IPv4) network; and communicating with a correspondent node via the configured tunnel using a mobile internet protocol (MIP6).

According to another aspect of the present invention, there is provided an automatic tunnel configuration method using a router advertisement message in mobile node, including: receiving a router advertisement message containing a tunnel end-point address option from an access router of an internet protocol version 6 (IPv6) network when the mobile node moves from a home network to other IPv6 networks; updating and storing the previously stored tunnel end-point information by checking the tunnel end-point address option included in the router advertisement message; automatically configuring a tunnel using an address allocated from the access router of the IPv6 network to which the mobile node connects, and the updated tunnel end-point information when the network to which the mobile node moves again to connect is an internet protocol version 4 (IPv4) network; and communicating with a correspondent node via the configured tunnel using a mobile internet protocol (MIP6).

BRIEF DESCRIPTION OF THE DRAWINGS

FIG. 1 is a diagram illustrating an initial stage for operation of a mobile internet protocol version 6 (MIP6).

FIG. 2 is a diagram illustrating that a mobile node moves from a home network to another IPv6 network.

FIG. 3 is a diagram illustrating a path optimization process in the stage of FIG. 2.

FIG. 4 is a diagram illustrating that a mobile node moves from an IPv6 home network to an IPv4 network according to an exemplary embodiment of the present invention.

FIG. 5 is a diagram illustrating that a mobile node moves from an IPv6 home network, which the mobile node has visited, to an IPv4 network according to an exemplary embodiment of the present invention.

FIG. 6 is a diagram illustrating a tunnel end-point address option according to an exemplary embodiment of the present invention.

FIG. 7 is a diagram illustrating a flowchart for automatic tunnel configuration according to an exemplary embodiment of the present invention.

BEST MODE FOR CARRYING OUT THE INVENTION

Hereinafter, exemplary embodiments of the present invention will now be described in detail with reference to the accompanying drawings. However, it should be understood that the same parts have the same reference numerals in the accompanying drawings when parts are endowed with their own reference numerals. In addition, it should be understood that detailed descriptions of known functions and configurations of the parts are omitted for clarity when the detailed descriptions are unnecessarily considered to depart from the scopes and spirits of the present invention.

In the exemplary embodiment of the present invention, even when a mobile node (MN) using MIP6 (Mobile IPv6) as an mobile internet protocol moves to an IPv4 network in an internet system under an internet environment where the IPv4 and IPv6 networks are used in a mixed state, a router advertisement (hereinafter, referred to as RA) message periodically transferred from an access router (AR) is used to configure a tunnel to the IPv6 network.

Hereinafter, the internet service system according to an exemplary embodiment of the present invention will be described in brief, and the tunnel configuration method using a RA message in this internet service system will be described in detail with reference to the accompanying drawings.

FIG. 4 is a diagram illustrating that a mobile node moves from an IPv6 home network to an IPv4 network according to an exemplary embodiment of the present invention, and FIG. 5 is a diagram illustrating that a mobile node moves from an IPv6 home network, which the mobile node has visited, to an IPv4 network according to an exemplary embodiment of the present invention.

Referring to FIGS. 4 and 5, in the case of the internet system for configuring an automatic tunnel using a RA message, the mobile node 101 moves from an IPv6-based home network 110 to an external IPv6 or an IPv4-based other networks 120 and 130, and then communicates with a correspondent node 102 through the other networks 120 and 130 using an optimized path. Here, a home agent (HA) 111 for enrolling a position where the mobile node 101 has moved is included in the home network 110, and access routers 121 and 131 to which the mobile node 101 moves to connect are included in the other networks 120 and 130.

As shown in FIG. 4, when the mobile node 101 moves from the home network 110 to the IPv4 network 130 in the internet system, a path 201 that passes through the IPv4 network 130 via the home network 110 is configured, and a tunnel between these networks is configured. This tunnel configuration method will be described in detail with reference to the accompanying drawings.

The mobile node periodically receives a RA message from an access router of an IPv6 network to which the mobile node is connecting, and transmits/receives RS (Router Solicitation)/RA messages from the access router on request of a host. In the exemplary embodiment of the present invention, among the transmitted/received messages, the RA message is used to configure an automatic tunnel between a home agent and a mobile node.

Accordingly, referring to FIG. 4, the home agent 111 corresponding to the access router of the IPv6 network 110 periodically transmits a RA message onto a subnet. Therefore, the mobile node 101 checks the movement to a network to which the mobile node 101 itself connects using prefix information included in the received RA message. Where the mobile node 101 moves to another IPv6 network 120 as described in the FIG. 5, the mobile node 101 checks the movement to another IPv6 network 120 by receiving a RA message from the access router 121 to which the mobile node 101 connects.

Such RA message has a new option added to configure an automatic tunnel between different networks in the existing RA message. A structure of the option, namely a tunnel end-point address option, included in the RA message is as shown in the accompanying FIG. 6. In this case, the tunnel end-point address option contains IPv4 information. The IPv4 information becomes an IPv4 address that represents an end point of a tunnel that will be formed later when the mobile node moves to an IPv4 network.

Referring to FIG. 6, the RA message may be composed of a Type, a Length, a reserved field (Res), and an IPv4 address (or, IPv4 tunnel end-point address) field.

The Type field is not set in the exemplary embodiment of the present invention, but a value of the Type field is determined by the IRNA authority. The Length filed has a value of 1, which represents the total length of the option and is an 8-byte unit. The IPv4 address is an IPv4 address of an access router that transmits a RA message.

An operation of configuring an automatic tunnel using the RA message as configured thus will be described in detail with reference to the accompanying drawing.

FIG. 7 is a diagram illustrating a flowchart for configuring an automatic tunnel according to an exemplary embodiment of the present invention.

Referring to FIG. 7, the mobile node 101 receives an RS/RA message (Operation 301). In this case, the received RA message is a message having a tunnel end-point address option added thereto, the option including an IPv4 address, as shown in FIG. 6. Then, the mobile node 101 stores the tunnel end-point information, namely the tunnel end-point information of the RA message, in an internal memory (Operation 302). The tunnel end-point information may include an IPv4 address included in the tunnel end-point address option, etc.

Then, the mobile node 101 checks whether the mobile node 101 itself moves to the IPv4 network 130 (Operation 303), and then performs a handover operation to the IPv4 network 130 when the mobile node 101 moves to the IPv4 network 130 (Operation 304). Then, the mobile node 101 directly allocates an address, namely the IPv4 address, of the connected network from the IPv4 network 130 to which the mobile node 101 moves when the mobile node 101 senses that the mobile node 101 moved to the IPv4 network 130 (Operation 305). On the contrary, when the mobile node 101 does not move to the IPv4 network 130, the mobile node 101 returns to the Operation 301, and then transmits/receives the messages periodically or on request.

Subsequently, the mobile node 101 uses the allocated address and the IPv4 address (or, the IPv4 tunnel end-point address) as both end points of the tunnel, respectively, to automatically generating an IPv6-over-IPv4 tunnel 201, the IPv4 address being obtained from the options in the RA message received from the previous network 110, and then maintains the connection with the IPv6 network using the generated tunnel (Operation 306).

The mobile node 101 performs the communication with the correspondent node 102 using an MIP6 protocol (Operation 307).

Accordingly, even when a mobile node moves to the IPv4 network which has difficulty in the use of the MIP6 protocol, the mobile node continues to perform the communication using the MIP6 protocol by maintaining the connection with the IPv6 network through the generated tunnel without severing the connection with the previously connected IPv6 network.

Meanwhile, in another exemplary embodiment of the present invention, the mobile node 101 may move from the home network to another IPv6 network 120, and then move again from the IPv6 network 120 to another IPv4 130 network, as shown in FIG. 5. In this case, the mobile node 101 transmits/receives messages, periodically or on request, to/from the access router 121 of the IPv6 network 120 which the mobile node 101 has visited, as shown in the Operation 301 of FIG. 7.

In this case, the mobile node 101 receives a RA message containing the IPv4 address identified in the access router 121, and then uses the received IPv4 address to change end points of the previous tunnel, thereby generating a new tunnel 202. Finally, the basic operations are performed in the same manner as in the above exemplary embodiment of the present invention.

Also, the automatic tunnel configuration method using a RA message according to the exemplary embodiments of the present invention, as described above, may be implemented as computer-readable codes in the computer-readable recording media. The computer-readable recording media include all kinds of recording systems that store data that may be read by the computer systems. Examples of the computer-readable recording media include ROM, RAM, CD-ROM, a magnetic tape, a hard disk, a floppy disk, a flash memory, an optical data storage device, and the like, and the computer-readable recording media also include recording systems that are used in the form of carrier waves (for example, in the form of transmission through internets). Also, since the computer-readable recording media are dispersed in the computer systems connected to the computer communication networks, the computer-readable recording media may be stored and implemented as codes that are readable in a dispersion mode. Also, a font ROM data structure according to the present invention may be implemented as the computer-readable codes in the recording media such as ROM, RAM, CD-ROM, a magnetic tape, a hard disk, a floppy disk, a flash memory, an optical data storage device, all of which are computer-readable.

INDUSTRIAL APPLICABILITY

As described above, the automatic tunnel configuration method according to the present invention can be useful to maintain the connection with the IPv6 network by automatically configuring a tunnel using a RA message including an IPv4 address option, and to ensure the operation of the MIP protocol, even when the mobile node moves to the IPv4 network, the mobile node driving an MIP protocol under a network environment where the IPv4 and IPv6 networks are used in a mixed state.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An automatic tunnel configuration method using a router advertisement message in a mobile node, the method comprising:
   connecting and receiving a router advertisement message containing a tunnel end-point address option from a first access router of an internet protocol version 6 (IPv6) network;
   allocating an address from a second access router of an internet protocol version 4 (IPv4) network to which the mobile node connects by checking whether a currently connected network is the IPv4 network when the mobile node is handed over;
   automatically configuring a tunnel using the address allocated from the second access router of the IPv4 network, and an IPv4 address of the tunnel end-point address option as both end points when a moved network is the IPv4 network; and maintaining the connection with the previously connected IPv6 network using the configured tunnel; and
   communicating with a correspondent node (CN) via the configured tunnel using a mobile internet protocol version 6 (MIPv6).

2. The automatic tunnel configuration method of claim 1, further comprising parsing the tunnel end-point address option in the router advertisement message to store the tunnel end-point address option in a tunnel end-point information management table.

3. The automatic tunnel configuration method of claim 1, wherein the router advertisement message includes a tunnel end-point address option having a Type, a Length, a reserved field, and an address field of the IPv4 network.

4. An automatic tunnel configuration method using a router advertisement message in a mobile node, the method comprising:
   connecting and receiving a router advertisement message containing a tunnel end-point address option from a first access router of an internet protocol version 6 (IPv6) network when the mobile node moves from a home network to other IPv6 networks;
   updating and storing a previously stored tunnel end-point information by checking the tunnel end-point address option included in the router advertisement message;
   allocating an address from a second access router of an internet protocol version 4 (IPv4) network to which the mobile node connects by checking whether a currently connected network is the IPv4 network when the mobile node is handed over;

automatically configuring a tunnel using the address allocated from the second access router of the IPv4 network, and an IPv4 address of the updated tunnel end-point information as both end points; and maintaining the connection with the previously connected IPv6 network using the configured tunnel when a moved network is the IPv4 network; and communicating with a correspondent node (CN) via the configured tunnel using a mobile internet protocol version 6 (MIPv6).

5. The automatic tunnel configuration method of claim 4, wherein the router advertisement message includes a tunnel end-point address option having a Type, a Length, a reserved field, and an IPv4 address field.

* * * * *